US012561370B2

(12) United States Patent
Loffay et al.

(10) Patent No.: US 12,561,370 B2
(45) Date of Patent: Feb. 24, 2026

(54) RANKING GRAPH ELEMENTS BASED ON NODE PROPERTY CRITERIA

(71) Applicant: RED HAT, INC., Raleigh, NC (US)

(72) Inventors: Pavol Loffay, Neuchatel (CH); Nicholas Fox, Emmaus, PA (US); John Joseph Mazzitelli, Sicklerville, NJ (US)

(73) Assignee: Red Hat, Inc., Raleigh, NC (US)

( * ) Notice: Subject to any disclaimer, the term of this patent is extended or adjusted under 35 U.S.C. 154(b) by 66 days.

(21) Appl. No.: 17/867,886

(22) Filed: Jul. 19, 2022

(65) Prior Publication Data

US 2024/0028645 A1      Jan. 25, 2024

(51) Int. Cl.
G06F 16/901        (2019.01)
G06F 16/2457       (2019.01)
G06F 16/26         (2019.01)

(52) U.S. Cl.
CPC .... G06F 16/9024 (2019.01); G06F 16/24578 (2019.01); G06F 16/26 (2019.01)

(58) Field of Classification Search
CPC . G06F 16/9024; G06F 16/26; G06F 16/24578
See application file for complete search history.

(56) References Cited

U.S. PATENT DOCUMENTS 9,652,510 B1 *  5/2017  Huang .............. G06F 16/24578
9,819,685 B1 * 11/2017  Scott ..................... H04L 63/104
10,721,791 B1  7/2020  Gamliel et al.
10,810,112 B2  10/2020  Rajagopalan et al.
11,184,241 B2  11/2021  Schermann et al.
11,188,561 B2  11/2021  Natanzon et al.
2016/0063118 A1 *  3/2016  Campbell ........... G06F 16/3322
                                                707/722
2022/0121481 A1 *  4/2022  Guim Bernat ........ G06F 9/5016
2022/0141304 A1 *  5/2022  Gefen ................... H04L 67/567
                                                709/219
2023/0196240 A1 *  6/2023  Pohle ...................... G06F 9/542
                                                705/7.27

OTHER PUBLICATIONS

Ma et al., "Graph-based and scenario-driven microservice analysis, retrieval, and testing", Future Generation Computer Systems 100, 2019; pp. 724-735.

(Continued)

*Primary Examiner* — Allen S Lin
(74) *Attorney, Agent, or Firm* — Kilpatrick Townsend & Stockton LLP

(57)        ABSTRACT

Graph elements can be ranked based on node property criteria. For example, a computing system can present, via a user interface of a user device, a graph that includes a plurality of nodes and a plurality of edges between the plurality of nodes. The plurality of nodes represent entities and the plurality of edges represent relationships between the entities. The computing device can receive a criteria related to node properties of the plurality of nodes for ranking the plurality of nodes in the graph. The computing device can generate a ranking of the plurality of nodes based on the criteria. The computing device can receive a condition associated with the ranking of the plurality of nodes and determine a subset of the plurality of nodes that satisfy the condition. The computing device can perform an action associated with the subset of the plurality of nodes that satisfy the condition.

15 Claims, 4 Drawing Sheets

(56) References Cited

OTHER PUBLICATIONS

Inoue et al., "Ranking Significance of Software Components Based on Use Relations", IEEE Transactions on Software Engineering, vol. 31, No. 3, Mar. 2005; pp. 22-25.
Xie et al., "Auditing the Sensitivity of Graph-based Ranking with Visual Analytics," arXiv:2009.07227v1, Sep. 15, 2020; pp. 1-11.
Inoue et al., Component Rank: Relative Significance Rank for Software Component Search, Graduate School of Information and Science and Technology, Osaka University; Japan Science and Technology Corporation, Japan; pp. 1-11.

* cited by examiner

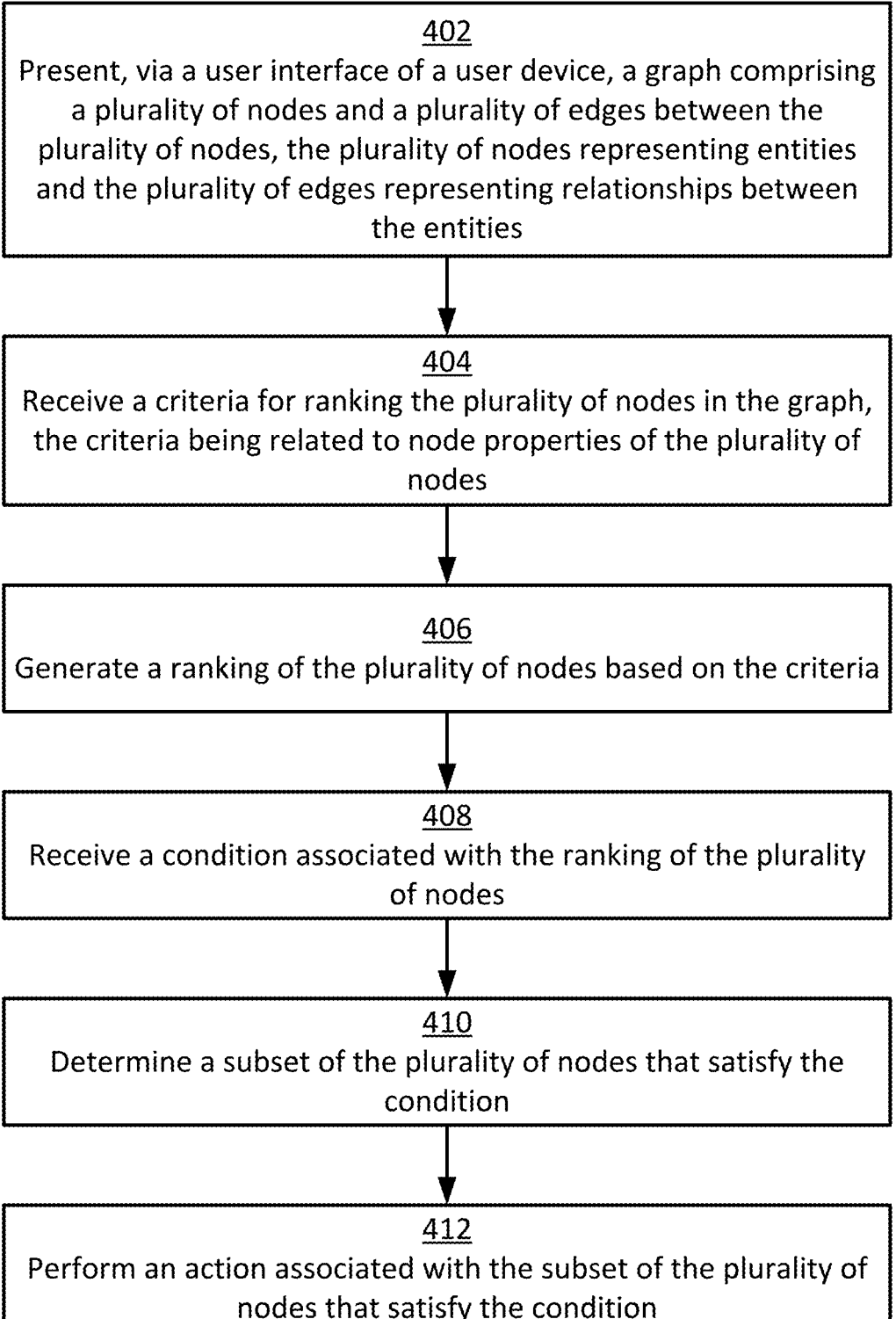

402
Present, via a user interface of a user device, a graph comprising a plurality of nodes and a plurality of edges between the plurality of nodes, the plurality of nodes representing entities and the plurality of edges representing relationships between the entities

404
Receive a criteria for ranking the plurality of nodes in the graph, the criteria being related to node properties of the plurality of nodes

406
Generate a ranking of the plurality of nodes based on the criteria

408
Receive a condition associated with the ranking of the plurality of nodes

410
Determine a subset of the plurality of nodes that satisfy the condition

412
Perform an action associated with the subset of the plurality of nodes that satisfy the condition

FIG. 4

RANKING GRAPH ELEMENTS BASED ON NODE PROPERTY CRITERIA

TECHNICAL FIELD

The present disclosure relates generally to graph networks. More specifically, but not by way of limitation, this disclosure relates to ranking graph elements based on node property criteria.

BACKGROUND

Graph networks can be created so that data can be represented visually for a user. A graph network can include nodes and edges, where the nodes represent entities and the edges represent relationships between entities. That is, two nodes may be connected via an edge if there is a relationship between the entities to which the nodes correspond. Graph networks can be used in various applications. For instance, a graph network may be generated to represent microservices of a software application, pods of a distributed computing cluster, people of a social network, and the like.

BRIEF DESCRIPTION OF THE DRAWINGS

FIG. 4 is a flow chart of a process for implementing ranking graph elements based on node property criteria according to some aspects of the present disclosure.

DETAILED DESCRIPTION

Figure 1:
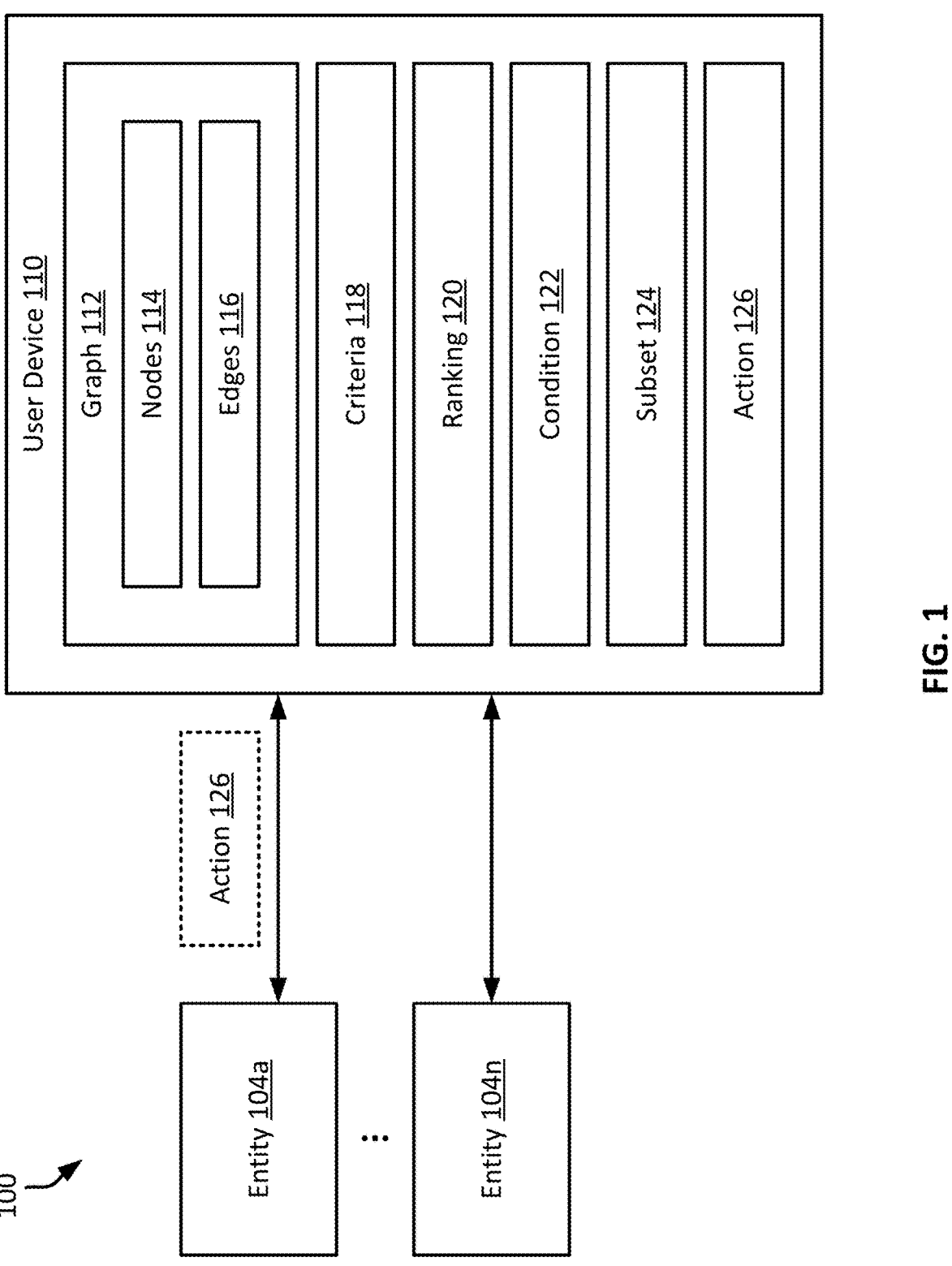
FIG. 1 is a block diagram of an example of a system for implementing ranking graph elements based on node property criteria according to some aspects of the present disclosure.

Graph networks often include many nodes and edges connecting the nodes. In particular, service mesh graphs that include nodes representing microservices can typically include hundreds or thousands of nodes. Because of the amount of nodes, it can be difficult to determine which nodes correspond to the most heavily used parts of the service mesh. So, a user may spend excessive amount of time attempting to analyze a service mesh graph. During the analysis, the user may make changes to the microservices based on assumed importance of the nodes, but the assumed importance may largely be a guess, so changes may not end up benefiting the microservices. Thus, extensive computing resources may be involved in analyzing a graph network and modifications may be suboptimal.

Some examples of the present disclosure can overcome one or more of the abovementioned problems by providing a system that can rank graph elements based on node property criteria. The system can present, via a user interface of a user device, a graph that includes nodes and edges between the nodes. The nodes represent entities, such as microservices, pods, or people, and the edges represent relationships between the entities. The system can receive a criteria related to node properties of the nodes for ranking the nodes in the graph. For instance, the criteria may relate to a number of inbound or outbound edges, a node throughput, a resource usage, etc. The system can generate a ranking of the nodes based on the criteria. The system can then receive a condition associated with the ranking of the nodes and determine a subset of the nodes that satisfy the condition. For instance, the condition can be a ranking threshold, and nodes that are ranked above or equal to the ranking threshold can satisfy the condition. The system can perform an action associated with the subset of the nodes that satisfy the condition. For instance, the system can highlight the subset of the nodes in the graph or cause an entity to change an operation. Thus, the user may be presented the nodes of interest and make appropriate changes to the entities, thereby reducing time involved in improving performance of the entities. In addition, the system can automatically implement changes based on the ranking and the condition to improve the performance of the entities.

One particular example can involve a system that presents a graph of 100 nodes, each representing a microservice, at a user interface of a user device. The system also presents edges representing connections between the microservices. Two of the nodes, node A and node B, each have ten inbound edges, and three of the nodes, node C, node D, and node E, each have nine inbound edges, while the remaining 95 nodes have eight or less inbound edges. The system receives a criteria of ranking the nodes based on the number of inbound edges and determines that node A and node B have a rank of one and node C, node D, and node E have a rank of two. Upon receiving a condition for including microservices with the top two most inbound edges in a subset of nodes, the system determines that nodes A, B, C, D, and E satisfy the condition. So, the system includes nodes A, B, C, D, and E in a subset of nodes. The system can then highlight each of nodes A, B, C, D, and E in the graph based on nodes A, B, C, D, and E being in the subset of nodes. Additionally or alternatively, the system may cause the microservices that correspond to nodes A, B, C, D, and E to increase their computing capacity to accommodate for the incoming requests. As such, ranking the nodes can allow for entities associated with nodes of interest to be identified and modified so that the performance of the entities can be improved.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing ranking graph elements based on node property criteria according to some aspects of the present disclosure. The system 100 can include a user device 110 and entities 104a-n. The entities 104a-n may be associated with the user device, or may be associated with other computing devices. Examples of the user device 110 and the other computing devices can include a desktop computer, a laptop, a mobile phone, server, etc. The user device 110 and the entities 104a-n can communicate over a network, such as a local area network (LAN) or the Internet.

In some examples, the user device 110 includes a user interface through which the user device 110 can receive inputs from a user and present outputs for display. For instance, the user device 110 may present a graph 112 via the user interface. The graph 112 can include nodes 114 and edges 116. Each of the nodes 114 can represent an entity, for instance of the entities 104a-n. The entities 104a-n may correspond to microservices of a software application, where each microservice is an independent component of an application process that is run as a service. The microservices can communicate application programming interfaces (APIs). If the entities 104a-n are microservices, the graph 112 can be a service mesh for visualizing how the microservices interact and perform. The entities 104a-n may alternatively be pods of a distributed computing cluster, people of a social graph, or any other suitable entity.

In any case, the edges 116 between the nodes 114 of the graph 112 can represent relationships between the entities 104a-n. For example, for a service mesh the edges 116 can represent incoming and outgoing requests for the microservices, for a distributed computing cluster the edges 116 can represent label selectors associated with the pods, and for a social graph the edges 116 can represent connections between the people. Each of the edges 116 can be labeled with properties such as a throughput associated with the edge or a number of requests associated with the edge. For example, an edge between a first node and a second node may be labeled with a throughput of 100 Mb/s for 200 requests, which indicates that the first node sends 200 requests to the second node at a rate of 100 Mb/s.

With the graph 112 presented via the user interface, the user device 110 can receive a criteria 118 for ranking the nodes 114 in the graph 112. For example, a user may interact with the user interface to select the criteria 118 from a defined list of criteria. The criteria 118 can be associated with node properties of the nodes 114. For instance, if the nodes 114 represent microservices, the node properties can include, for each node, a number of inbound edges, a number of outbound edges, a node throughput, a percentage of errors, a resource usage, or any other suitable node property. So, the criteria 118 may be the number of inbound edges. Each criteria can be associated with an algorithm for determining a ranking 120 in accordance with the criteria 118. That is, a criteria of the number of inbound edges can be associated with an algorithm for ranking the nodes 114 based on the number of inbound edges, a criteria of the number of outbound edges can be associated with an algorithm for ranking the nodes 114 based on the number of outbound edges, a criteria of the node throughput can be associated with an algorithm for ranking the nodes 114 based on the node throughput, etc.

The user device 110 may receive multiple criteria 118 for ranking the nodes 114. For example, the criteria 118 may involve the number of inbound requests and the node throughput. The user device 110 can execute a first algorithm to determine a first ranking for the nodes 114 in accordance with the number of inbound requests. So, nodes with a higher number of inbound requests can be ranked higher in the first ranking. The user device 110 can also execute a second algorithm to determine a second ranking for the nodes 114 in accordance with the node throughput, where nodes with a higher node throughput can be ranked higher. From the first ranking and the second ranking, the user device 110 can determine the ranking 120 to be a combined ranking. To do so, the user device 110 may add together, for a node, the rank value for the node in the first ranking and the rank value for the node in the second ranking to determine a score. For instance, if the node has a rank value of five in the first ranking and a rank value of three in the second ranking, the score can be eight for the node. A second node may have a rank value of six in the first ranking and a rank value of one in the second ranking, so the score for the second node can be seven. The user device 110 can then determine the ranking 120 based on the scores. So, the user device 110 can rank the first node below the second node, since the score for the second node is lower than the score for the first node.

In some examples, each criteria may be associated with a weight value, so determining the ranking 120 can involve factoring in the weight value for each criteria. For instance, the number of inbound requests may be associated with a weight value that is lower than a weight value for the node throughput. So, rather than summing the scores for each ranking, the user device 110 may first multiply the scores by the weight value and then sum the resulting weighted scores. The user device 110 can then generate the ranking 120 based on the weighted scores.

Upon receiving the selection of the criteria 118 or of the associated algorithm, the user device 110 can generate the ranking 120 of the nodes 114. The user device 110 executes the algorithm to calculate a score for each node based on the criteria 118. For instance, if the criteria 118 is the number of inbound edges, the algorithm may sum up, for each node individually, the inbound edges, and the score can be the number of inbound edges. The user device 110 then generates the ranking 120 based on the scores. For example, nodes with higher numbers of inbound edges can be ranked higher than nodes with fewer numbers of inbound edges in the ranking 120.

In some examples, the user device 110 can also receive a condition 122 associated with the ranking 120 of the nodes 114. The condition 122 may be provided by the user as a ranking threshold. For example, if the user wants to determine which of the nodes 114 are associated with the top two highest number of inbound edges, the condition 122 can be a ranking threshold of "<=2", assuming that a lower number in the ranking 120 is associated with a higher rank. That is, a rank of one is the highest, a rank of two is the next highest, and so on.

Upon receiving the condition 122, the user device 110 can determine a subset 124 of the nodes 114 that satisfy the condition 122. To do so, the user device 110 can determine which of the nodes 114 are associated with a ranking value above the ranking threshold. So, if the ranking threshold is "<=2", the user device 110 can determine which nodes have a ranking value of one and two in the ranking 120. The user device 110 can then include the nodes with the ranking value of one and two in the subset 124.

Based on the subset 124, the user device 110 can perform an action 126. The action 126 may involve adjusting a presentation of the subset 124 of the nodes 114 via the user interface. For instance, the user device 110 may highlight each node in the subset 124 or otherwise modify how each node in the subset 124 is presented. Thus, the user may be able to identify which nodes satisfy the condition 122.

Alternatively, the user device 110 may cause a change to an operation of an entity based on the entity corresponding to a node in the subset 124. For example, a first node in the graph 112 may correspond to the entity 104a, which can be microservice that sends requests to a database that corresponds to a second node in the graph 112. The user device 110 can determine that the database is overloaded and then determine that an edge from the first node to the second node indicates that the microservice sends a higher number of requests to the database than other microservices. Upon determining that the number of requests received is the highest for the microservice (e.g., the ranking 120 for the first node in accordance with the criteria 118 being the number of received requests by the second node is one and the condition 122 is a ranking threshold of "1"), the user device 110 can reroute requests from the microservice so that the database can become less loaded. So, the user device 110 can send the action 126 to the entity 104a, which can cause the entity 104a to reroute requests for the database. In addition to traffic control actions, the user device 110 may trigger actions related to autoscaling, alerting, or any other suitable action for the entities 104*a-n*.

FIG. 1 is illustrative and non-limiting. Other examples may include more components, fewer components, different components, or a different arrangement of the components shown in FIG. 1.

Figure 2:
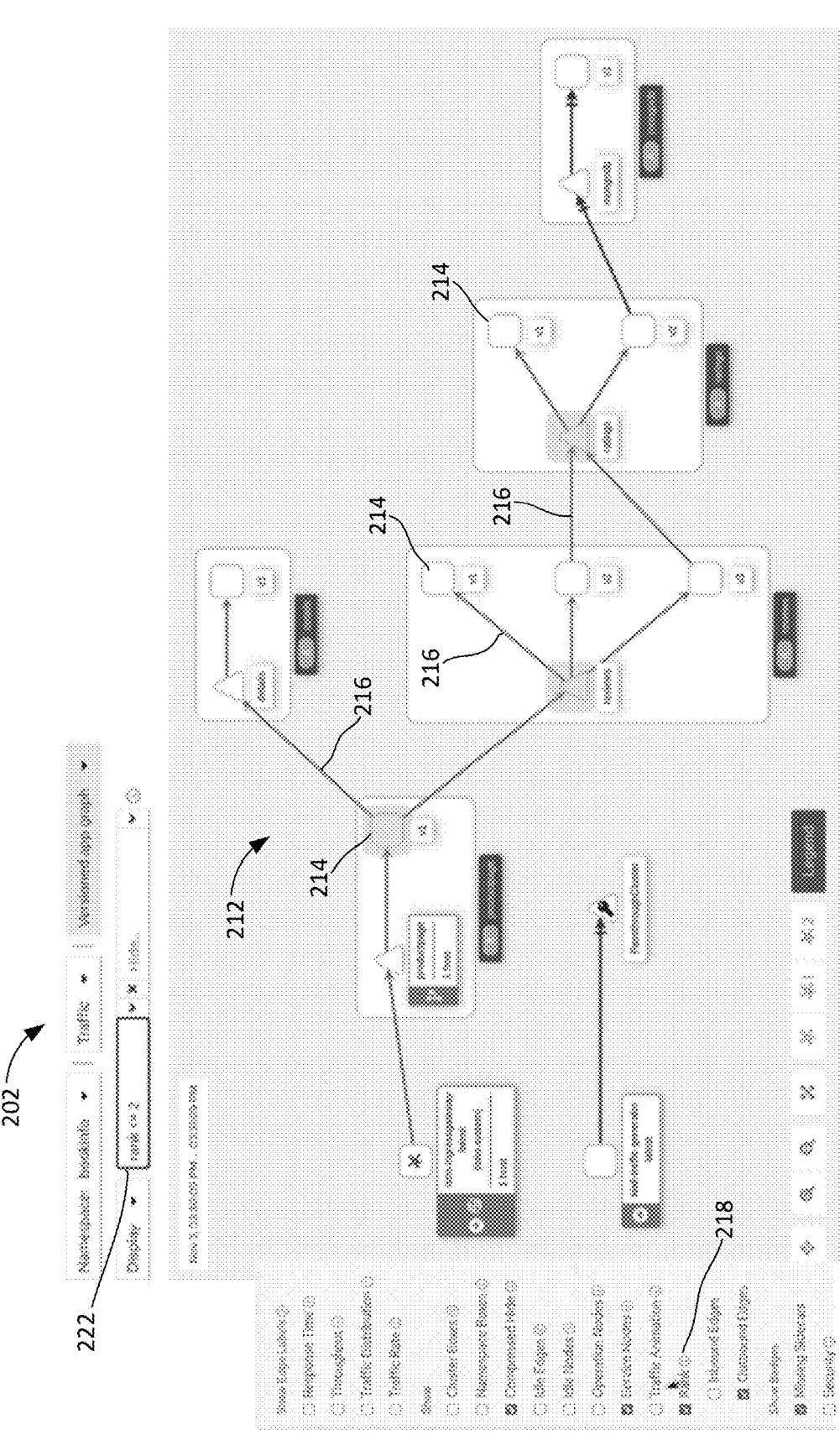
FIG. 2 is a diagram of an example of a graph with ranked nodes according to some aspects of the present disclosure.

FIG. 2 is a diagram of an example of a graph 212 with ranked nodes according to some aspects of the present disclosure. The graph 212 includes nodes 214 representing microservices and edges 216 representing relationships between the microservices. The graph 212 is displayed via a user interface 202. The user interface 202 can receive a selection of a criteria 218 for ranking the nodes 214. For instance, the criteria 218 is illustrated as being a number of outbound edges. The user interface 202 also receives a condition 222 of "<=2" for the ranking. So, upon generating the ranking of the nodes 214 based on the number of outbound edges, the presentation of the nodes that satisfy the condition 222 is adjusted. For example, three nodes have a ranking of two or higher, so the three nodes are highlighted in the graph 212.

Figure 3:
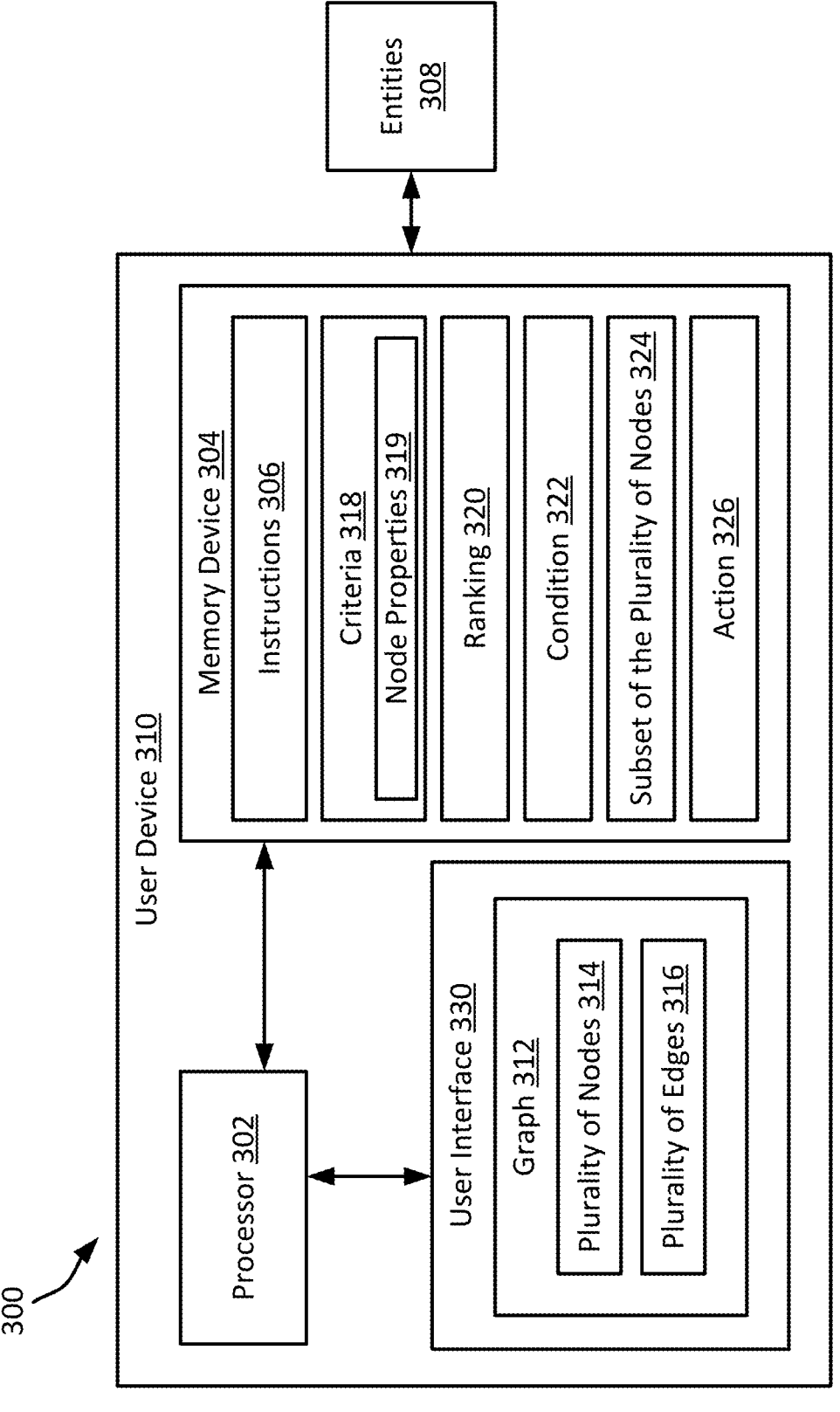
FIG. 3 is a block diagram of another example of a system for implementing ranking graph elements based on node property criteria according to some aspects of the present disclosure.

FIG. 3 is a block diagram of another example of a system 300 for implementing ranking graph elements based on node property criteria according to some aspects of the present disclosure. The system 300 includes a processor 302, which may be part of a user device 310, which may be an example of user device 110 in FIG. 1.

In this example, the processor 302 is communicatively coupled with a memory device 304. The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory device 304 to perform operations. The instructions 306 can include processor-specific instructions generated by a compiler or an interpreter from code written in any suitable computer-programming language, such as C, C++, C#, etc.

The memory device 304 can include one memory or multiple memories. Non-limiting examples of the memory device 304 can include electrically erasable and programmable read-only memory (EEPROM), flash memory, or any other type of non-volatile memory. At least some of the memory device 304 includes a non-transitory computer-readable medium from which the processor 302 can read the instructions 306. The non-transitory computer-readable medium can include electronic, optical, magnetic, or other storage devices capable of providing the processor 302 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 306.

In some examples, the processor 302 can execute the instructions 306 to perform operations. For example, the processor 302 can present, via a user interface 330 of a user device 310, a graph 312 that includes a plurality of nodes 314 and a plurality of edges 316 between the plurality of nodes 314. The plurality of nodes 314 can represent entities 308 and the plurality of edges 316 can represent relationships between the entities 308. The processor 302 can receive a criteria 318 for ranking the plurality of nodes 314 in the graph 312. The criteria 318 can be related to node properties 319 of the plurality of nodes 314. The processor 302 can generate a ranking 320 of the plurality of nodes 314 based on the criteria 318. The processor 302 can also receive a condition 322 associated with the ranking 320 of the plurality of nodes 314. The processor 302 can determine a subset of the plurality of nodes 324 that satisfy the condition 322. The processor 302 can perform an action 326 associated with the subset of the plurality of nodes 324 that satisfy the condition 322. For instance, the action 326 may involve adjusting a presentation of the subset of the plurality of nodes 324 via the user interface 330, or causing a change to an operation of an entity associated with the subset of the plurality of nodes 324. So, the action 326 can result in improving a determination of entities having properties of interest, or the action 326 can result in improving the operation of the entities 308.

FIG. 4 is a flow chart of a process for implementing ranking graph elements based on node property criteria according to some aspects of the present disclosure. The processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, the processor 302 can present, via a user interface 330 of a user device 310, a graph 312 comprising a plurality of nodes 314 and a plurality of edges 316 between the plurality of nodes 314. The plurality of nodes 314 can represent entities 308 and the plurality of edges 316 can represent relationships between the entities 308. For instance, the entities 308 may be microservices, pods, or people. In the example of microservices, the plurality of edges 316 can represent incoming and outgoing requests to and from the microservices.

In block 404, the processor 302 can receive a criteria 318 for ranking the plurality of nodes 314 in the graph 312. The node properties 319 can include a number of inbound edges, a number of outbound edges, a node throughput, a percentage of errors, a resource usage, or a combination thereof. The criteria 318 can be related to node properties 319 of the plurality of nodes 314. The criteria 318 can be received by a user selecting an algorithm that corresponds to a node property of interest. For example, the user may select an algorithm associated with the node property of resource usage. In some examples, the processor 302 can receive multiple criteria for ranking the plurality of nodes 314.

In block 406, the processor 302 can generate a ranking 320 of the plurality of nodes 314 based on the criteria 318. The processor 302 can execute the algorithm to determine a score for each node of the plurality of nodes 314. The processor 302 can then generate the ranking 320 based on the scores. The ranking 320 can assign each node of the plurality of nodes a ranking value, where a lower ranking value corresponds to a higher ranking. Multiple nodes may be associated with a same ranking value.

In block 408, the processor 302 can receive a condition 322 associated with the ranking 320 of the plurality of nodes 314. The condition 322 may be a ranking threshold related to the ranking values of the plurality of nodes 314. For instance, a ranking threshold of "<=5" can mean that any nodes of the plurality of nodes 314 that have a ranking value of one through five in the ranking 120 satisfy the condition 322.

In block 410, the processor 302 can determine a subset of the plurality of nodes 324 that satisfy the condition 322. The processor 302 can determine the nodes that have the ranking value above the ranking threshold and include the nodes with the ranking value above the ranking threshold in the subset of the plurality of nodes 324. So, if the ranking threshold is "<=5", any nodes that are associated with the ranking value of one through five in the ranking 120 satisfy the condition 322, so the processor 302 can include these nodes in the subset of the plurality of nodes 324.

In block 412, the processor 302 can perform an action 326 associated with the subset of the plurality of nodes 324 that satisfy the condition 322. The action 326 may involve the processor 302 adjusting, via the user interface 330, a presentation of the subset of the plurality of nodes 324. For example, the nodes in the subset of the plurality of nodes 324 may be highlighted in the graph 312 at the user interface 330. Adjusting the presentation of the subset of the plurality of nodes 324 can allow a user to identify nodes (and as a result entities) of interest in a reduced time so that further action can be taken to improve performance of the entities 308. Or, the action 326 may involve the processor 302 causing a change to an operation of an entity of the entities 308 that is associated with the subset of the plurality of nodes 324. For instance, if the processor 302 determines that an entity is associated with a highest resource usage, the processor 302 may cause additional resource capacity to be added to the entity. The processor 302 may additionally or alternatively change a routing of traffic to the entity. Causing a change to an entity can allow the processor 302 to automatically implement changes to improve performance of the entities 308.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory device including instructions that are executable by the processor for causing the processor to:
present, via a user interface of a user device, a service mesh graph comprising a plurality of nodes and a plurality of edges between the plurality of nodes, the plurality of nodes representing microservices and the plurality of edges representing relationships between the microservices, an edge of the plurality of edges being labeled with a throughput value associated with the edge or a number of requests associated with the edge;
present, via the user interface, a criteria selection feature and a condition selection feature;
receive, via the criteria selection feature of the user interface, a criteria for ranking the plurality of nodes in the service mesh graph from a defined list of criteria options, the criteria being related to node properties of the plurality of nodes;
generate a ranking of the plurality of nodes based on the criteria;
receive, via the condition selection feature of the user interface, a condition associated with the ranking of the plurality of nodes, wherein the condition comprises a ranking threshold for identifying a subset of the plurality of nodes;
determine the subset of the plurality of nodes that satisfy the condition;

adjust a presentation of the subset of the plurality of nodes by adding a highlight to each node of the subset of the plurality of nodes at the user interface; and
cause a change to a traffic routing operation of a microservice associated with the subset of the plurality of nodes to redistribute a load of the microservices.

2. The system of claim 1, wherein the memory device further includes instructions that are executable by the processor for causing the processor to:
receive the criteria for ranking the plurality of nodes by receiving a selection of an algorithm for ranking the plurality of nodes, the algorithm be ng associated with the criteria;
execute the algorithm to calculate a score for each node of the plurality of nodes based on the criteria; and
generate the ranking based on the score for each node of the plurality of nodes.

3. The system of claim 1, wherein the memory device further includes instructions that are executable by the processor for causing the processor to:
determine nodes of the plurality of nodes associated with a ranking value above the ranking threshold; and
include the nodes with the ranking value above the ranking threshold in the subset of the plurality of nodes.

4. The system of claim 1, wherein the criteria is a first criteria for ranking the plurality of nodes in the service mesh graph and the ranking is a first ranking and wherein the memory device further includes instructions that are executable by the processor for causing the processor to:
receive a second criteria for ranking the plurality of nodes in the service mesh graph;
generate a second ranking of the plurality of nodes based on the second criteria;
generate a combined ranking based on the first ranking and the second ranking; and
determine the subset of the plurality of nodes based on the combined ranking.

5. The system of claim 1, wherein the relationships comprise inbound requests to the microservices and outbound requests from the microservices, and the node properties comprise a number of inbound edges, a number of outbound edges, a node throughput, a percentage of errors, or a resource usage.

6. The system of claim 1, wherein the memory device further includes instructions that are executable by the processor for causing the processor to:
adjust a resource capacity of the microservice based on the microservice being included in the subset of the plurality of nodes.

7. A method comprising:
presenting, via a user interface of a user device, a service mesh graph comprising a plurality of nodes and a plurality of edges between the plurality of nodes, the plurality of nodes representing microservices and the plurality of edges representing relationships between the microservices, an edge of the plurality of edges being labeled with a throughput value associated with the edge or a number of requests associated with the edge;
presenting, via the user interface, a criteria selection feature and a condition selection feature;
receiving, via the criteria selection feature of the user interface, a criteria for ranking the plurality of nodes in the service mesh graph from a defined list of criteria options, the criteria being related to node properties of the plurality of nodes;

generating a ranking of the plurality of nodes based on the criteria;

receiving, via the condition selection feature of the user interface, a condition associated with the ranking of the plurality of nodes, wherein the condition comprises a ranking threshold for identifying a subset of the plurality of nodes;

determining the subset of the plurality of nodes that satisfy the condition;

adjusting a presentation of the subset of the plurality of nodes by adding a highlight to each node of the subset of the plurality of nodes at the user interface; and causing a change to a traffic routing operation of a microservice associated with the subset of the plurality of nodes to redistribute a load of the microservices.

8. The method of claim 7, further comprising:

receiving the criteria for ranking the plurality of nodes by receiving a selection of an algorithm for ranking the plurality of nodes, the algorithm being associated with the criteria;

executing the algorithm to calculate a score for each node of the plurality of nodes based on the criteria; and generating the ranking based on the score for each node of the plurality of nodes.

9. The method of claim 7, further comprising:

determining nodes of the plurality of nodes associated with a ranking value above the ranking threshold; and including the nodes with the ranking value above the ranking threshold in the subset of the plurality of nodes.

10. The method of claim 7, wherein the criteria is a first criteria for ranking the plurality of nodes in the service mesh graph and the ranking is a first ranking and further comprising:

receiving a second criteria for ranking the plurality of nodes in the service mesh graph;

generating a second ranking of the plurality of nodes based on the second criteria;

generating a combined ranking based on the first ranking and the second ranking; and determining the subset of the plurality of nodes based on the combined ranking.

11. The method of claim 7, wherein the relationships comprise inbound requests to the microservices and outbound requests from the microservices, and the node properties comprise a number of inbound edges, a number of outbound edges, a node throughput, a percentage of errors, or a resource usage.

12. A non-transitory computer-readable medium comprising program code that is executable by a processor for causing the processor to:

present, via a user interface of a user device, a service mesh graph comprising a plurality of nodes and a plurality of edges between the plurality of nodes, the plurality of nodes representing microservices and the plurality of edges representing relationships between the microservices, an edge of the plurality of edges being labeled with a throughput value associated with the edge or a number of requests associated with the edge;

present, via the user interface, a criteria selection feature and a condition selection feature;

receive, via the criteria selection feature of the user interface, a criteria for ranking the plurality of nodes in the service mesh graph from a defined list of criteria options, the criteria being related to node properties of the plurality of nodes;

generate a ranking of the plurality of nodes based on the criteria;

receive, via the condition selection feature of the user interface, a condition associated with the ranking of the plurality of nodes, wherein the condition comprises a ranking threshold for identifying a subset of the plurality of nodes;

determine the subset of the plurality of nodes that satisfy the condition;

adjust a presentation of the subset of the plurality of nodes by adding a highlight to each node of the subset of the plurality of nodes at the user interface; and cause a change to a traffic routing operation of a microservice associated with the subset of the plurality of nodes to redistribute a load of the microservices.

13. The non-transitory computer-readable medium of claim 12, further comprising program code that is executable by the processor for causing the processor to:

receive the criteria for ranking the plurality of nodes by receiving a selection of an algorithm for ranking the plurality of nodes, the algorithm being associated with the criteria;

execute the algorithm to calculate a score for each node of the plurality of nodes based on the criteria; and generate the ranking based on the score for each node of the plurality of nodes.

14. The non-transitory computer-readable medium of claim 12, further comprising program code that is executable by the processor for causing the processor to:

determine nodes of the plurality of nodes associated with a ranking value above the ranking threshold; and include the nodes with the ranking value above the ranking threshold in the subset of the plurality of nodes.

15. The non-transitory computer-readable medium of claim 12, wherein the criteria is a first criteria for ranking the plurality of nodes in the service mesh graph and the ranking is a first ranking and further comprising program code that is executable by the processor for causing the processor to:

receive a second criteria for ranking the plurality of nodes in the service mesh graph;

generate a second ranking of the plurality of nodes based on the second criteria;

generate a combined ranking based on the first ranking and the second ranking; and determine the subset of the plurality of nodes based on the combined ranking.

* * * * *